(12) United States Patent
Katsurai et al.

(10) Patent No.: US 9,997,059 B2
(45) Date of Patent: Jun. 12, 2018

(54) DATA COLLECTION SYSTEM

(71) Applicant: Yokogawa Electric Corporation, Musashino-shi, Tokyo (JP)

(72) Inventors: Tooru Katsurai, Musashino (JP); Kazunori Miyazawa, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 0 days. days.

(21) Appl. No.: 15/536,499

(22) PCT Filed: Nov. 17, 2015

(86) PCT No.: PCT/JP2015/082268
§ 371 (c)(1),
(2) Date: Jun. 15, 2017

(87) PCT Pub. No.: WO2016/098512
PCT Pub. Date: Jun. 23, 2016

(65) Prior Publication Data
US 2017/0372598 A1    Dec. 28, 2017

(30) Foreign Application Priority Data
Dec. 17, 2014    (JP) .................................. 2014-254629

(51) Int. Cl.
*H04B 14/04*    (2006.01)
*G08C 15/06*    (2006.01)
(Continued)

(52) U.S. Cl.
CPC ............. *G08C 15/06* (2013.01); *G08C 13/02* (2013.01); *G08C 15/12* (2013.01); *G08C 19/025* (2013.01);
(Continued)

(58) Field of Classification Search
CPC .................................. H04B 3/50; H01B 11/16
(Continued)

(56) References Cited

U.S. PATENT DOCUMENTS 4,751,614 A    6/1988    Mehnert
4,807,149 A    2/1989    Mehnert
(Continued)

FOREIGN PATENT DOCUMENTS

JP    63-35096 A    2/1988
JP    64-89839 A    4/1989
(Continued)

OTHER PUBLICATIONS

Search Report dated Feb. 23, 2016 issued by the International Searching Authority in counterpart International Application No. PCT/JP2015/082268 (PCT/ISA/210/220).
(Continued)

*Primary Examiner* — Helene Tayong
(74) *Attorney, Agent, or Firm* — Sughrue Mion, PLLC (57) ABSTRACT

A data collection system includes a plurality of sensor modules each provided with a sensor unit, and a data collecting device. The data collecting device (200) is provided with: a clock output unit (201) which outputs a clock signal; an enable signal output unit (202) which outputs to a prescribed sensor module (100) an enable signal at intervals equal to or greater than the number of clock signals corresponding to the number of sensor modules (100); a counter (203) which counts the number of clock signals; and a sensor signal input unit (205) into which data output by the sensor modules (100) is input via a bus line, and which records said data in association with the count value. Using the clock signal as a trigger, each sensor module (100) functions as a shift register feeding the enable signal to the subsequent stage sensor module (100), and each sensor
(Continued)

module (100) outputs output data from the sensor unit (110) in said sensor module (100) to the sensor signal input unit (205) only when the enable signal has been fed to said sensor module (100).

6 Claims, 6 Drawing Sheets

(51) Int. Cl.
*G08C 13/02* (2006.01)
*G08C 19/02* (2006.01)
*H04B 3/50* (2006.01)
*G08C 15/12* (2006.01)
*H01B 11/16* (2006.01)

(52) U.S. Cl.
CPC ..... *H04B 3/50* (2013.01); *G05B 2219/25028* (2013.01); *H01B 11/16* (2013.01)

(58) Field of Classification Search
USPC .......................................................... 375/354
See application file for complete search history.

(56) References Cited

U.S. PATENT DOCUMENTS

| | | |
|---|---|---|
| 4,873,518 A | 10/1989 | Mehnert |
| 5,247,292 A | 9/1993 | Nakanishi et al. |
| 6,732,217 B1 | 5/2004 | Nishikido |
| 2015/0142998 A1* | 5/2015 | Burtch ................ G06F 13/4221 710/72 |

FOREIGN PATENT DOCUMENTS

| | | |
|---|---|---|
| JP | 8-298513 A | 11/1996 |
| JP | 2002-271878 A | 9/2002 |
| JP | 2008-175638 A | 7/2008 |

OTHER PUBLICATIONS

Written Opinion dated Feb. 23, 2016 issued by the International Searching Authority in counterpart International Application PCT/JP2015/082268 (PCT/ISA/237).

\* cited by examiner

DATA COLLECTION SYSTEM

TECHNICAL FIELD

The present invention relates to a data collection system configured to collect data from a plurality of sensors, and more particularly, to a data collection system capable of reducing complexity of wirings even when there are many sensors.

RELATED ART

A plurality of sensors is arranged at a target such as a facility, a structure and the like, and data is collected from the respective sensors so as to monitor or inspect a state of the target. For example, in order to detect a local reduction in thickness or a defect of a piping caused due to corrosion, erosion or the like, a data collection system having hundreds of magnetic sensors arranged at the piping and configured to collect data, which is to be output from the respective magnetic sensors, has been put to practical use. A data collection system having sensors such as thermometers, hygrometers and the like arranged at respective parts in a plant or the like and configured to collect data, which is to be output from the respective sensors, has also been put to practical use.

Figure 6:
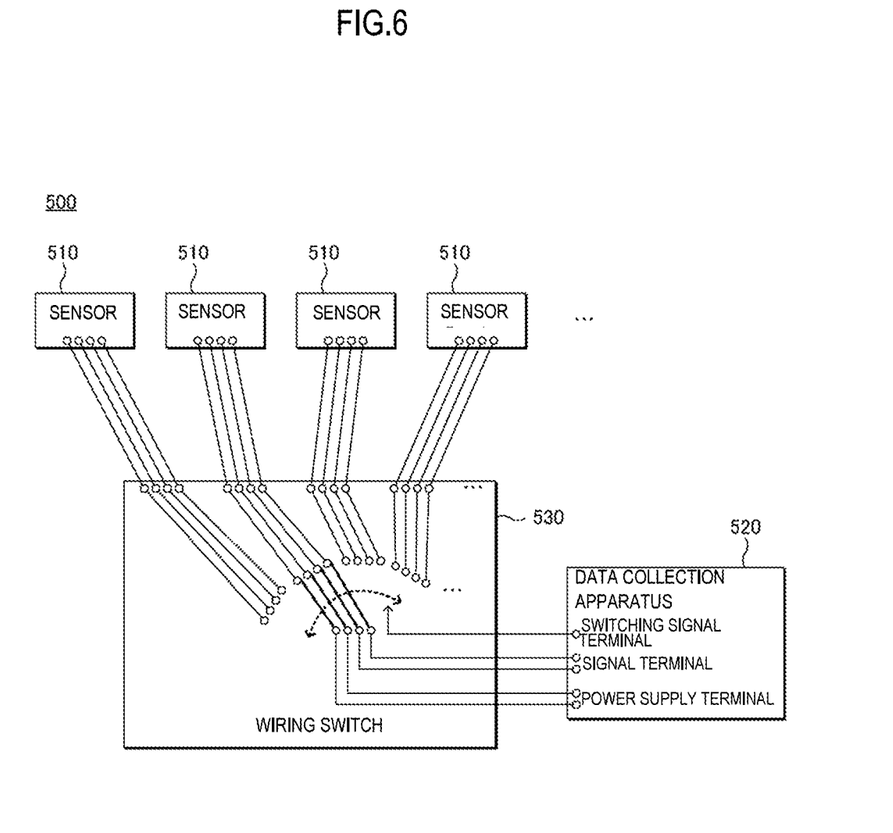
FIG. 6 is a block diagram depicting a configuration example of a data collection system of the related art.

FIG. 6 is a block diagram depicting a configuration example of a data collection system 500 of the related art. As shown in FIG. 6, the data collection system 500 includes a plurality of sensors 510, a data collection apparatus 520 and a wiring switch 530.

The data collection apparatus 520 is configured to feed power to the sensors 510 of connection destinations and to receive data measured by the sensors 510. The respective sensors 510 and the data collection apparatus 520 are interconnected via the wiring switch 530. The data collection apparatus 520 is configured to control the wiring switch 530 by a switching signal and to sequentially switch the sensors 510 of connection destinations for data collection.

In general, the many sensors 510 are connected to the data collection apparatus 520. However, it is preferably to sequentially acquire the data, in many cases. For this reason, the wiring switch 530 is used in view of the connection aspect.

CITATION LIST

Patent Documents

Patent Document 1: Japanese Patent Application Publication No. 2008-175638A

SUMMARY OF THE INVENTION

Problems to be Solved

In the data collection apparatus 520 of the related art, it is necessary to individually interconnect the wiring switch 530 and the respective sensors 510. Also, a plurality of wirings such as a wiring for data signal and a wiring for power feed is adopted for each of the sensors. When the number of the sensors 510 is large, the number of the wirings is massive. For this reason, the wiring of the sensors 510 is troublesome.

It is therefore an object of the present invention to provide a data collection system capable of reducing complexity of wirings even when there are many sensors.

Means for Solving Problems

In order to achieve the above object, according to the present invention, there is provided a data collection system including a plurality of sensor modules each having a sensor unit, and a data collection apparatus. The data collection apparatus includes a clock output unit configured to output a clock to each sensor module, an enable signal output unit configured to output an enable signal to a predetermined sensor module at an interval equal to or greater a number of clocks corresponding to the number of the sensor modules, a counter configured to count the number of clocks, and a sensor signal input unit configured to receive data, which is output from the sensor modules, via a bus line and to record the data in association with a count value. Each of the sensor modules is configured to function as a shift register configured to send the enable signal to a subsequent stage sensor module by using the clock as a trigger, and to output data of the sensor unit to the sensor signal input unit via the bus line only when the enable signal has been sent.

Herein, each of the sensor modules may include an amplifier configured to switch between enable and disable states by the enable signal.

Also, the data collection apparatus may be configured to feed power by a power supply line bus-connected to each sensor module.

In this case, the sensor module may include a switch configured to switch the power feeding to the sensor unit by the enable signal.

Also, the data collection apparatus may be configured to record a count value corresponding to the sensor module for which it is not necessary to input data, and to shorten an interval of the clocks upon counting of the count value.

Also, the counter may be configured to reset the count value upon output of the enable signal.

Effects of the Invention

According to the present invention, it is possible to provide the data collection system capable of reducing complexity of wirings even when there are many sensors.

DETAILED DESCRIPTION OF EXEMPLARY EMBODIMENTS

Figure 1:
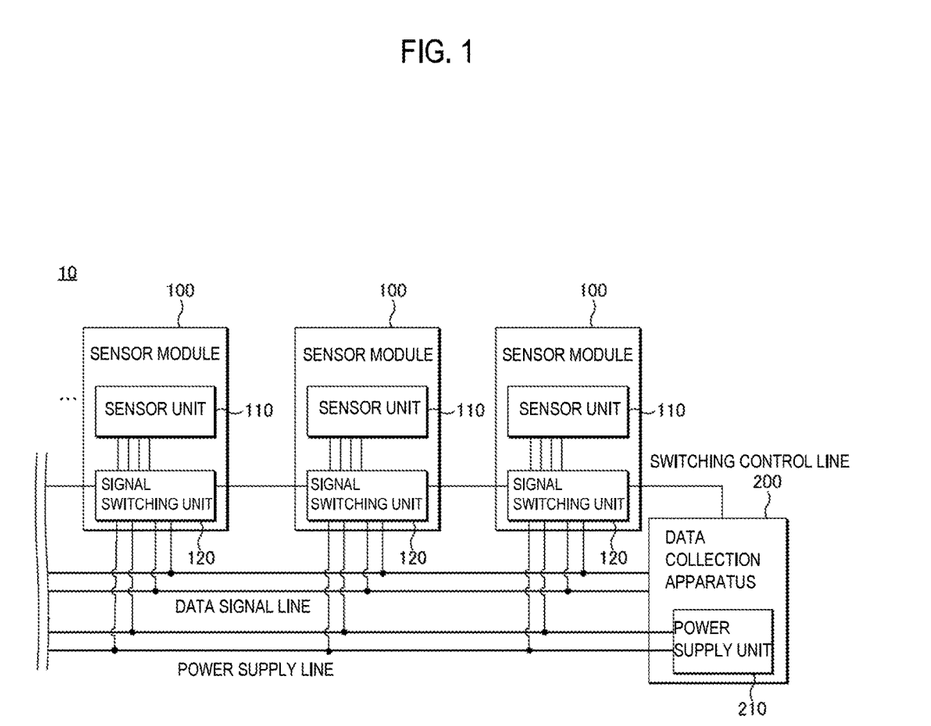
FIG. 1 is a block diagram depicting a configuration of a data collection system in accordance with an exemplary embodiment.

An exemplary embodiment of the present invention will be described with reference to the drawings. FIG. 1 is a block diagram depicting a configuration of a data collection system 10 in accordance with an exemplary embodiment. As shown in FIG. 1, the data collection system 10 includes a plurality of sensor modules 100 and a data collection apparatus 200.

The respective sensor modules 100 and the data collection apparatus 200 are connected by a data signal line and a power supply line in a bus-type topology form. For this reason, since it is not necessary to independently make a wiring for each sensor module 100, it is possible to reduce the complexity of the wirings even though the number of the sensor modules 100 is large.

Also, the data collection apparatus 200 and the sensor modules 100 are interconnected by a switching control line. The switching control line includes a clock signal line and an enable signal line. The clock signal line is connected by the bus-type topology, and the enable signal line is connected in a loop or cascade shape (refer to FIG. 2). For this reason, the sensor modules 100 are connected to the enable signal line in a multi-stage manner.

Each sensor module 100 has a sensor unit 110 and a signal switching unit 120. The sensor unit 110 is configured to be supplied with power from the data collection apparatus, to measure physical amounts such as temperature, voltage, magnetism and the like, and to output the measured physical amounts as analog data of a predetermined range. A measurement target of each sensor module 100 is not required to be the same as long as the sensor unit 110 of each sensor module 100 has the same interface of the data output.

The signal switching unit 120 is configured to be supplied with the power from the data collection apparatus 200 via the power supply line and to output data, which is to be output from the sensor unit 110, to the data collection apparatus 200 via the data signal line. The signal switching unit 120 of each sensor module 100 is configured to perform a sequential operation by receiving a switching control signal from the data collection apparatus 200 via a switching control line. Thereby, the data collection apparatus 200 can sequentially receive the data from the respective sensor modules 100.

Figure 2:
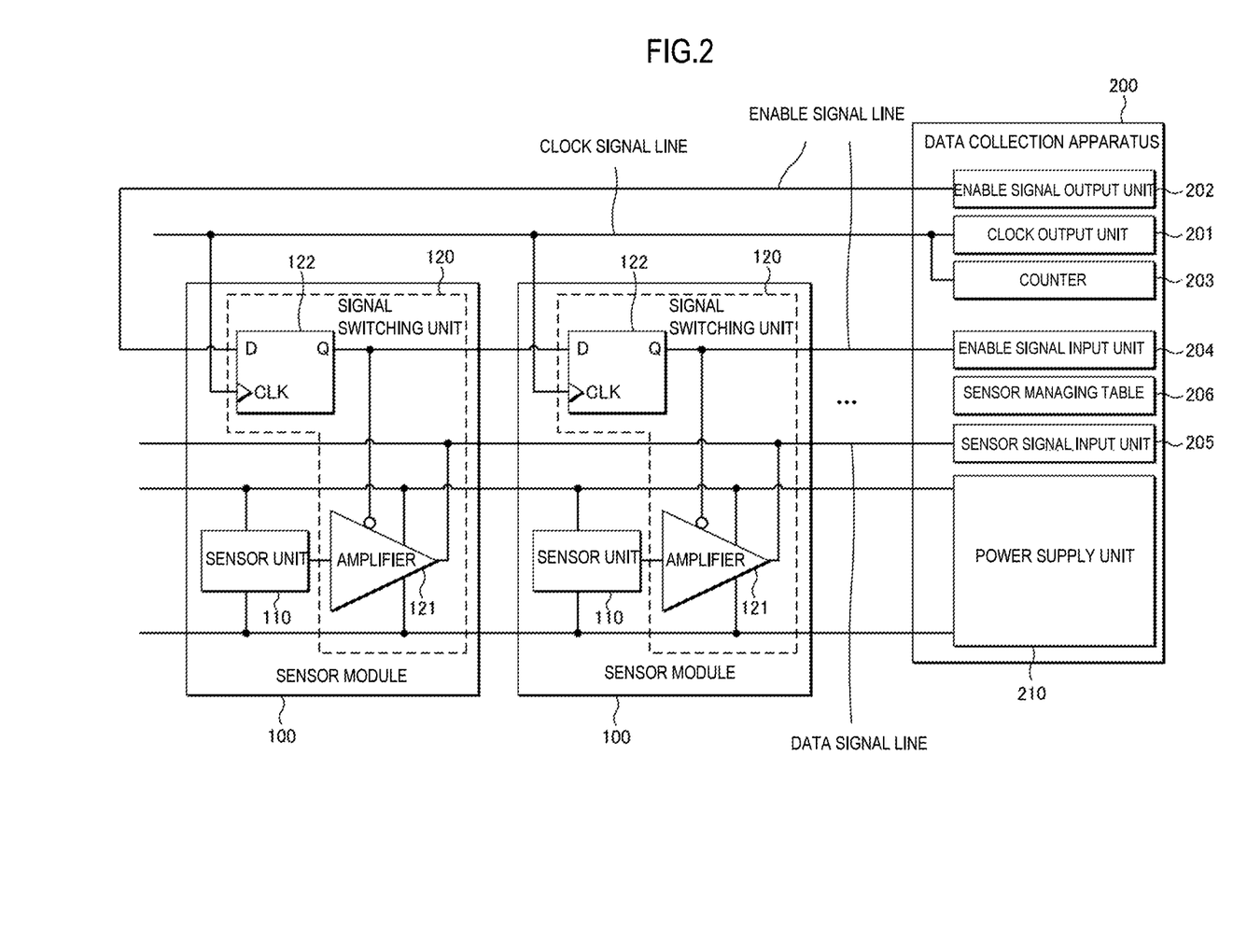
FIG. 2 is a block diagram depicting specific configuration examples of a sensor module and a data collection apparatus.

FIG. 2 is a block diagram depicting specific configuration examples of the sensor module 100 and the data collection apparatus 200. As shown in FIG. 2, the signal switching unit 120 of the sensor module 100 includes an amplifier 121 having a disable function and a D-type flip-flop 122. Also, the data collection apparatus 200 includes a clock output unit 201, an enable signal output unit 202, a counter 203, an enable signal input unit 204, a sensor signal input unit 205, a sensor managing table 206, and a power supply unit 210.

In the signal switching unit 120, a Q output of the D-type flip-flop 122 is inverting input to a disable terminal of the amplifier 121 having a disable function and becomes a D input of the subsequent stage signal switching unit 120 by the enable signal line. At this time, as the D input of the first stage sensor module 100, an output signal of the enable signal output unit 202 is input by the enable signal line, and the Q output of the final stage sensor module 100 is input to the enable signal input unit 204 by the enable signal line.

A clock from the clock output unit 201 is input to a clock terminal CLK of each D-type flip-flop 122 by a clock signal line. For this reason, the D-type flip-flop 122 of the respective sensor modules 100 connected in the multi-stage manner forms a shift register configured to shift the enable signal, which is to be output from the enable signal output unit 202, to a subsequent stage for each clock of the clock output unit 201. In the meantime, when the shift register is formed by each sensor module 100, a circuit except for the D-type flip-flop 122 may be used for the configuration.

The amplifier 121 having a disable function is configured so that an output is a high impedance at a disable state, and is configured to amplify analog data, which is to be output by the sensor unit 110 at an enable state, and to output the same to the data signal line. That is, the output data of the sensor unit 110 is sent to the data collection apparatus 200 only when the enable signal is sent from the previous stage. The sensor module 100 at this time is referred to as 'enable state'.

However, instead of the amplifier 121 having a disable function, a normal amplifier and an output switch in which on and off states of the output switch is switched by the Q output of the D-type flip-flop 122 may be used.

In the data collection apparatus 200, the clock output unit 201 is configured to output a clock with a predetermined period. The clock output unit can also output a clock at a higher speed than normal or stop the same.

The enable signal output unit 202 is configured to output an enable signal (H) at an interval equal to or greater a number of clocks corresponding to the number of the stages of the sensor modules 100. For this reason, a situation where the plurality of sensor modules 100 becomes at the enable state at the same time does not occur.

The counter 203 is configured to count the number of clocks. The counter 203 resets a count value when the enable signal output unit 202 outputs the enable signal (H). Thereby, it is possible to associate the count value of the counter 203 and the sensor module 100 at the enable state each other.

The enable signal input unit 204 is configured to receive the enable signal that is to be output by the final stage sensor module 100. Thereby, it is possible to check that the enable signal has been shifted to all the sensor modules 100. Also, it is possible to check the number of the sensor modules 100 by referring to the count value of the counter 203 at the time when the enable signal input unit 204 receives the enable signal. However, the enable signal input unit 204 may be omitted.

The sensor signal input unit 205 is configured to receive the data output from the sensor module 100 and to digital-convert the same. It is possible to specify from which the sensor module 100 the data is output by referring to the count value of the counter 203. On the other hand, the digital conversion may be performed at the sensor module 100-side.

The sensor managing table 206 is configured to record the data, which is received by the sensor signal input unit 205, in association with the count value. Attributes and the like of the sensor unit 110 may also be recorded. Also, when there is a defective sensor module 100 or the sensor module 100 that is not required to be measured, the count value corresponding to such a sensor module 100 may be recorded. In this case, when the counter 203 counts the count value, it is possible to reduce time devoted to the data collection by sending the clock at high speed.

Figure 3:
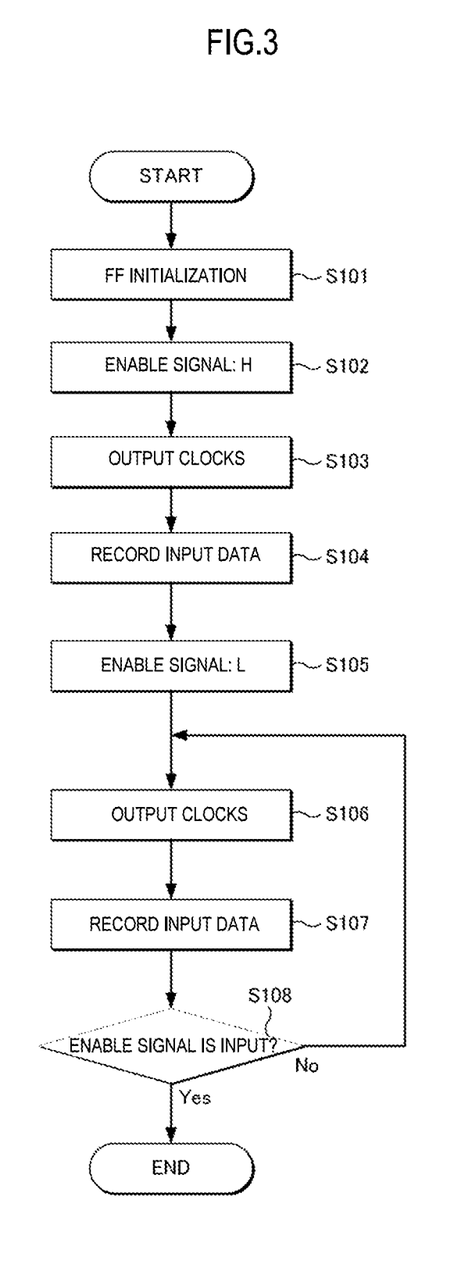
FIG. 3 is a flowchart depicting a data collection sequence in the data collection system of the exemplary embodiment.

The data collection system 10 having the above configuration can perform the data collection in accordance with a sequence as shown in FIG. 3. That is, at a timing of the data collection, the data collection system initializes the D-type flip-flops 122 of the respective sensor modules 100 (S101). In the meantime, the timing of the data collection may be continuous or a predetermined interval or may be based on a user's instruction, for example.

The initialization of the D-type flip-flops 122 is made by outputting the clocks equal or greater the number of the sensor modules 100 with the output of the enable signal output unit 202 being kept at a low state (L). At this time, in order to shorten the processing time, the clocks are preferably sent at higher speed than normal. Alternatively, a reset signal line may be provide and the D-type flip-flops 122 may be initialized all together by the reset signal line.

Then, the data collection system sets the output of the enable signal output unit 202 to a high state (H) and outputs the enable signal (S102). Thereby, the counter 203 is reset. At the state where the output of the enable signal output unit 202 is the high state (H), when the clocks are output (S103), the count value of the counter 203 proceeds, and the first stage sensor module 100 is at the enable state and the data of the sensor units 110 is output. Then, the data collection system records the data input to the sensor signal input unit 205 in the sensor managing table 206 in association with the count value (S104).

Thereafter, the data collection system sets the output of the enable signal output unit 202 to the low state (L) (S105) and outputs the clocks (S106). Thereby, since the count value of the counter 203 proceeds and the sensor modules 100 become at the enable state in a sequential order, the data collection system records the data input to the sensor signal input unit 205 in the sensor managing table 206 in association with the count value (S107). In the meantime, as the period of the clock, a period suitable for the data collection system 10 can be arbitrarily set.

The data collection system repeats the processing of outputting the clocks (S106) and recording the input data (S107) until the enable signal input unit 204 inputs the enable signal (S108). On the other hand, the data collection system may repeat the processing until the count value of the counter 203 reaches the number of the sensor modules 100.

By the above sequence, it is possible to sequentially collect the data from all the sensor modules 100. As described above, the data collection system may be configured to continuously perform next data collection processing immediately after the data collection processing shown in FIG. 3 is over or to perform next data collection processing at a predetermined or unspecific interval.

In general, the amplifier 121 having a disable function is at a power saving mode under the disable state. Therefore, the data collection system 10 of the exemplary embodiment can prevent an increase in power consumption even though the power is fed to the sensor modules 100 in the bus-type connection manner.

Figure 4:
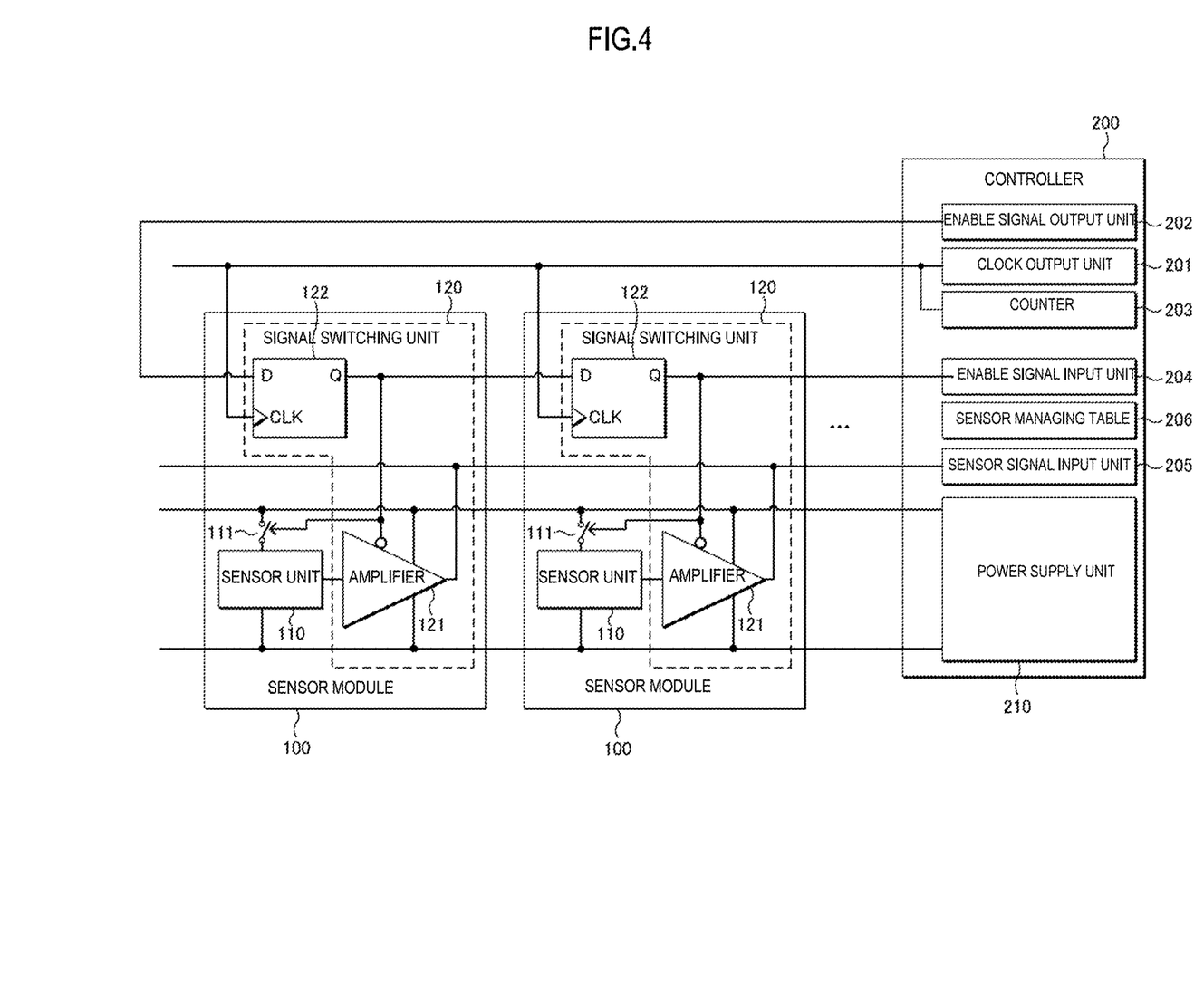
FIG. 4 is a block diagram depicting another configuration example of the data collection system of the exemplary embodiment.

In order to further save the power, as shown in FIG. 4, a switch 111 may be provided on the power supply line of the sensor unit 110, and on and off states thereof may be switched by the enable signal, like the amplifier 121 having a disable function. In this case, the sensor unit 110 is configured to operate only at the enable state. The sensor signal input unit 205 is configured to record the output data when the state of the sensor unit 110 is stabilized.

Figure 5:
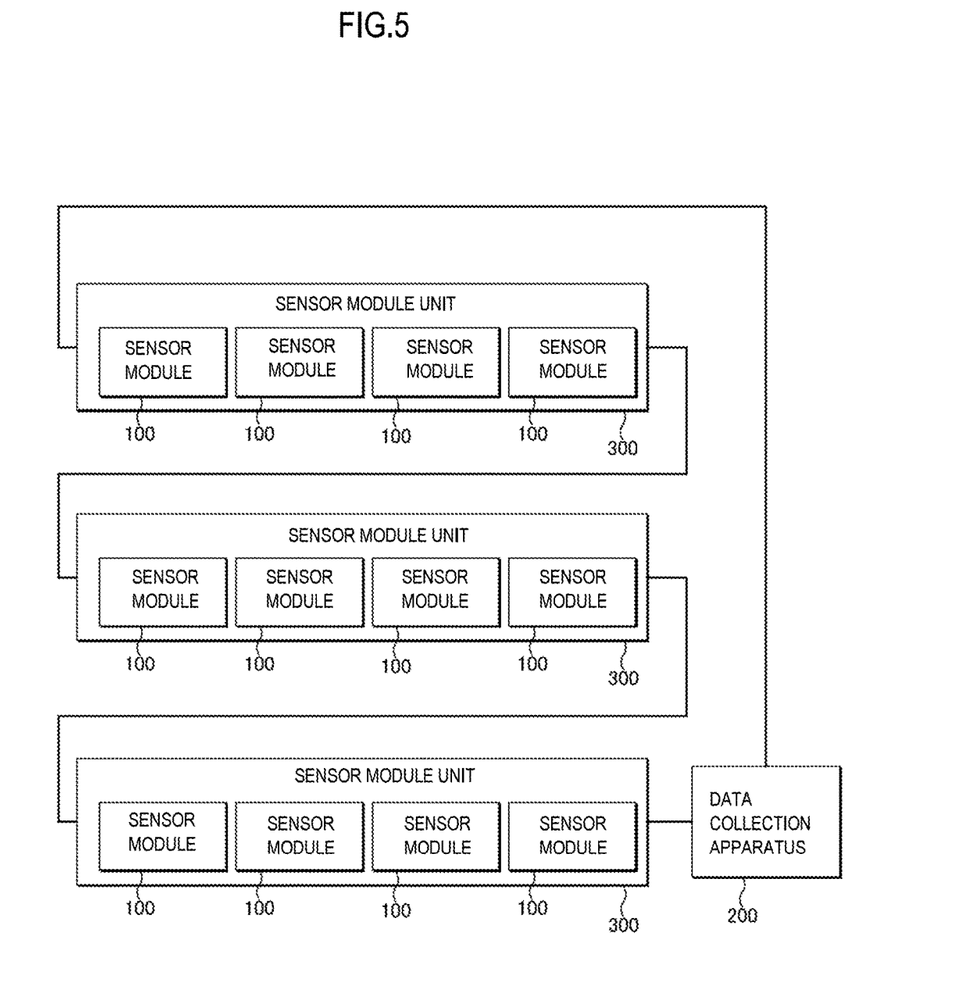
FIG. 5 depicts an example of a unitized sensor module.

Also, as shown in FIG. 5, a plurality of sensor modules 100 may be unitized to configure a sensor module unit 300, so that it is possible to easily treat a large amount of the sensor units 110. In this case, since it is not necessary to make wirings between the respective sensor modules 100 in the sensor module unit 300, it is possible to further reduce the complexity of the wirings while maintaining the basic configuration.

In the meantime, the above descriptions are just to indicate the specific favorable exemplary embodiments so as to illustrate and exemplify the present invention. Therefore, the present invention is not limited to the above exemplary embodiments and includes more changes and modifications that can be made without departing from the gist of the present invention. In the meantime, the subject application is based on a Japanese Patent Application No. 2014-254629 filed on Dec. 17, 2014, which is entirely incorporated by reference. Also, all the references referred to herein are incorporated in its entirety.

DESCRIPTION OF REFERENCE NUMERALS

10 . . . data collection system, 100 . . . sensor module, 110 . . . sensor unit 111 . . . switch, 120 . . . signal switching unit, 121 . . . amplifier having disable function 122 . . . D-type flip-flop, 200 . . . data collection apparatus, 201 . . . clock output unit 202 . . . enable signal output unit, 203 . . . counter, 204 . . . enable signal input unit 205 . . . sensor signal input unit, 206 . . . sensor managing table 210 . . . power supply unit, 300 . . . sensor module unit

The invention claimed is:

1. A data collection system comprising: a plurality of sensor modules each having a sensor unit; and a data collection apparatus, wherein the data collection apparatus comprises: a clock output unit configured to output a clock to each sensor module; an enable signal output unit configured to output an enable signal to a predetermined sensor module at an interval equal to or greater than a number of clocks corresponding to the number of the sensor modules,
   a counter configured to count the number of clocks, and
   a sensor signal input unit configured to receive data, which is output from the sensor modules, via a bus line and to record the data in association with a count value, and wherein each of the sensor modules is configured to function as a shift register configured to send the enable signal to a subsequent stage sensor module by using the clock as a trigger, and to output data of the sensor unit to the sensor signal input unit via the bus line only when the enable signal has been sent.

2. The data collection system according to claim 1, wherein each of the sensor modules comprises an amplifier configured to switch between enable and disable states by the enable signal.

3. The data collection system according to claim 1, wherein the data collection apparatus is configured to feed power by a power supply line bus-connected to each sensor module.

4. The data collection system according to claim 3, wherein the sensor module comprises a switch configured to switch the power feeding to the sensor unit by the enable signal.

5. The data collection system according to claim 1, wherein the data collection apparatus is configured to record a count value corresponding to the sensor module for which it is not necessary to input data, and to shorten an interval of the clocks upon counting of the count value.

6. The data collection system according to claim 1, wherein the counter is configured to reset the count value upon output of the enable signal.

\* \* \* \* \*